US012424164B2

(12) United States Patent
Choi et al.

(10) Patent No.: US 12,424,164 B2
(45) Date of Patent: Sep. 23, 2025

(54) DISPLAY DEVICE WITH VARIABLE IMAGE RESOLUTION

(71) Applicant: Google LLC, Mountain View, CA (US)

(72) Inventors: Sangmoo Choi, Palo Alto, CA (US); Choongho Lee, San Diego, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/267,516

(22) PCT Filed: Oct. 31, 2022

(86) PCT No.: PCT/US2022/048354
§ 371 (c)(1),
(2) Date: Jun. 15, 2023

(87) PCT Pub. No.: WO2024/096850
PCT Pub. Date: May 10, 2024

(65) Prior Publication Data

US 2024/0274075 A1 Aug. 15, 2024

(51) Int. Cl.
*G09G 3/3233* (2016.01)

(52) U.S. Cl.
CPC ... *G09G 3/3233* (2013.01); *G09G 2300/0861* (2013.01); *G09G 2310/021* (2013.01);
(Continued)

(58) Field of Classification Search
CPC ......... G09G 3/3233; G09G 2300/0861; G09G 2310/021; G09G 2310/0297; G09G 2330/021; G09G 2340/0414
See application file for complete search history.

(56) References Cited

U.S. PATENT DOCUMENTS

| | | | | |
|---|---|---|---|---|
| 5,130,703 | A | 7/1992 | Fairbanks et al. | |
| 10,964,262 | B1 * | 3/2021 | Lin | G09G 3/2022 |

(Continued)

FOREIGN PATENT DOCUMENTS

| | | |
|---|---|---|
| EP | 2998955 | 3/2016 |
| EP | 3327715 | 5/2018 |

OTHER PUBLICATIONS

Emagin.com [online], "WUXGA-R5: 1920 X 1200 Low-Power Color XL AMOLED MicroDisplay" Jan. 2021, retrieved on Dec. 8, 2023, retrieved from URL <https://www.emagin.com/images/products/wuxga/datasheets/1000092_Rev_AWU_XGA_R5_CFXL_Datasheet_v1.pdf>, 93 pages.

(Continued)

*Primary Examiner* — Ibrahim A Khan
(74) *Attorney, Agent, or Firm* — Fish & Richardson P.C.

(57) ABSTRACT

The subject matter described in this disclosure can be embodied in methods, systems, and program products for operating a display device that includes a pixel array addressed by a set of data lines and a set of scan lines. A method includes: addressing the set of data lines with first image data; sending a first scan signal to a first line of pixels using a first scan line to move the first image data to the first line of pixels; activating the first line of pixels to emit light; sending a second scan signal to a second line of pixels using a second scan line, without having addressed the set of data lines with image data after having addressed the set of data lines with the first image data; and activating the second line of pixels to emit light after the second scan signal has been sent.

19 Claims, 7 Drawing Sheets

(52) U.S. Cl.
CPC ............... *G09G 2310/0297* (2013.01); *G09G 2330/021* (2013.01); *G09G 2340/0414* (2013.01)

(56) References Cited

U.S. PATENT DOCUMENTS

| | | | | |
|---|---|---|---|---|
| 2006/0232541 | A1 | 10/2006 | Kudo et al. | |
| 2006/0262051 | A1 | 11/2006 | Kim et al. | |
| 2007/0124633 | A1 | 5/2007 | Kim | |
| 2011/0222559 | A1* | 9/2011 | Ishii | H04N 13/161 370/498 |
| 2013/0088479 | A1* | 4/2013 | Kim | G09G 3/3688 345/212 |
| 2015/0029233 | A1 | 1/2015 | Bae et al. | |
| 2016/0189619 | A1* | 6/2016 | Park | G09G 3/3233 345/77 |
| 2016/0329014 | A1* | 11/2016 | Lee | G09G 3/2096 |
| 2016/0358537 | A1* | 12/2016 | Kang | G09G 3/20 |
| 2017/0103706 | A1* | 4/2017 | Yang | G06F 3/044 |
| 2017/0132990 | A1* | 5/2017 | He | G09G 3/3426 |
| 2017/0148420 | A1* | 5/2017 | Gao | G09G 3/20 |
| 2017/0309219 | A1* | 10/2017 | Kong | G09G 3/2003 |
| 2018/0025468 | A1* | 1/2018 | Kim | G06T 3/20 345/682 |
| 2018/0366084 | A1* | 12/2018 | Bedi | G09G 5/00 |
| 2019/0005884 | A1 | 1/2019 | Yoo | |
| 2020/0234645 | A1 | 7/2020 | Wen et al. | |
| 2020/0242997 | A1* | 7/2020 | Xue | G09G 3/20 |
| 2020/0409223 | A1* | 12/2020 | Suehiro | G02F 1/134309 |
| 2021/0201798 | A1* | 7/2021 | Kim | G09G 3/3233 |
| 2021/0319743 | A1* | 10/2021 | Chou | G09G 3/2096 |
| 2021/0358369 | A1* | 11/2021 | Zhang | G09G 3/20 |
| 2022/0157259 | A1* | 5/2022 | Wang | G09G 3/3266 |
| 2022/0189412 | A1* | 6/2022 | Noh | G09G 3/035 |
| 2023/0018362 | A1* | 1/2023 | Park | G09G 3/3241 |
| 2023/0101184 | A1* | 3/2023 | Liu | G09G 3/20 345/209 |
| 2023/0122051 | A1* | 4/2023 | Yang | G09G 3/3241 345/206 |
| 2023/0143178 | A1* | 5/2023 | Kim | G09G 3/3233 345/212 |

OTHER PUBLICATIONS

International Search Report and Written Opinion in International Appln. PCT/US2022/048354, mailed on Jun. 30, 2023, 28 pages.
Invitation to Additional Fees, and Where Applicable, Protest Fees in International Appln. No. PCT/US2022/048354, mailed on May 9, 2023, 17 pages.
Office Action in European Appln. No. 22829962.4, mailed on Aug. 16, 2024, 9 pages.
Office Action in European Appln. No. 22829962.4, mailed on Jul. 2, 2025, 9 pages.

* cited by examiner

DISPLAY DEVICE WITH VARIABLE IMAGE RESOLUTION

CROSS-REFERENCE TO RELATED APPLICATION

This application is a National Stage Application under 35 U.S.C. § 371 and claims the benefit of International Application No. PCT/US2022/048354, filed Oct. 31, 2022. The disclosure of the foregoing application is hereby incorporated by reference in its entirety.

TECHNICAL FIELD

This document generally relates to display devices.

BACKGROUND

Electronic devices can include display devices on which visual images are shown. A high resolution of visual images presented on a display can provide a more detailed presentation of content to a user.

SUMMARY

This document describes techniques, methods, systems, and other mechanisms for providing a display device that can operate in a higher-resolution mode and a reduced-resolution mode. In some examples, the display device can enter a reduced-resolution mode in response to the display device, or a computing system including the display device, entering a battery saver mode. The computing system can be, for example, a personal computer, a mobile telephone, a smart phone, a smart watch, or a smart TV.

When a computing device experiences low battery levels, it can enter a battery saver mode, in which the display screen contents (e.g., user experience (UX) image) can be simplified, screen contents may include non-color images, processing speed is reduced, applications update at reduced frequencies, and/or network transmissions occur less often.

Employing a battery saver mode can reduce power consumption of the device. However, power consumption of the display modules may remain the same and not diminish if the display is presenting content under an always-on-display (AOD) driving condition. Thus, the battery saving amount is limited. Switching the display to a reduced-resolution mode can enable a computing system to remain in an always-on display driving condition while reducing battery consumption of the display.

The disclosed techniques can be implemented in display devices, e.g., display devices including AMOLED displays. In some examples, a display device includes multiplexers for routing image data from a data driver to data lines of pixel circuitry. In a reduced-resolution mode, the multiplexers can operate at a reduced frequency that is a fraction of the frequency of operation during a higher-resolution mode. For example, the multiplexers can operate at a reduced frequency that is half the frequency of operation during the higher-resolution mode. To reduce the frequency of multiplexer operations, multiplexer signals can be controlled to toggle for fewer than all pixel row line times. In some cases, the multiplexer signals can toggle only for odd-numbered pixel rows, or only for even-numbered pixel rows.

Multiplexer circuits can have a parasitic capacitance, including due to including parallelly connected TFT switches. Multiplexer switch control signals can alternate between high and low voltage states frequently. Thus, the multiplexer can consume a large amount of power in the display. In some examples, the multiplexer consumes 6.7% of total driving power consumption in an always-on-display. Advantages of the disclosed techniques include reducing the power consumption of a display device during an always-on-display mode. In some examples, power consumption is reduced by 3.4% or greater in a reduced-resolution mode compared to a higher-resolution mode.

As additional description to the embodiments described below, the present disclosure describes the following embodiments.

Embodiment 1 is directed to a method of operating a display device that includes an array of pixels addressed by a set of data lines and a set of scan lines, the method comprising: presenting, by the display device, a first frame of image content, including by: addressing the set of data lines with first image data for a first portion of the first frame of image content: sending a first scan signal to a first line of pixels of the array of pixels, using a first scan line of the set of scan lines, to move the first image data from the set of data lines to the first line of pixels: activating the first line of pixels to emit light after the first scan signal has been sent to the first line of pixels: sending a second scan signal to a second line of pixels of the array of pixels, using a second scan line of the set of scan lines, without having addressed the set of data lines with image data after having addressed the set of data lines with the first image data; and activating the second line of pixels to emit light after the second scan signal has been sent to the second line of pixels.

Embodiment 2 is the method of any of the preceding embodiments, wherein: after the first scan signal is sent to the first line of pixels, the first image data that is addressed to the set of data lines decays in intensity to a decayed version of the first image data; and sending the second scan signal to the second line of pixels moves the decayed version of the first image data to the second line of pixels.

Embodiment 3 is the method of any of the preceding embodiments, wherein the first image data comprises a set of voltages that each define an intensity at which a corresponding pixel in the first line of pixels is to emit light.

Embodiment 4 is the method of any of the preceding embodiments, wherein the second line of pixels is an immediately next line of pixels in the array of pixels after the first line of pixels.

Embodiment 5 is the method of any of the preceding embodiments, wherein: the first portion of the first frame of image content is a first line of image content from the first frame of image content; and a second portion of the first frame of image content is a second line of image content from the first frame of image content.

Embodiment 6 is the method of any of the preceding embodiments, wherein: addressing the set of data lines with the first image data includes using multiple multiplexers to route the first image data to the set of data lines, each multiplexer of the multiple multiplexers being configured to route image data to a corresponding subset of data lines within the set of data lines, such that the set of data lines includes multiple subsets of data lines corresponding to the multiple multiplexers.

Embodiment 7 is the method of embodiment 6, wherein the multiple multiplexers receive the first image data from a display device integrated circuit that is a component of the display device.

Embodiment 8 is the method of any one of embodiments 6 or 7, wherein sending the second scan signal to the second line of pixels is performed by the display device without the multiple multiplexers having routed image data to the set of data lines after the set of data lines was addressed with the first image data.

Embodiment 9) is the method of embodiment 6, wherein: the display device includes a display driver integrated circuit: addressing the set of data lines with the first image data includes the display driver integrated circuit sending control signals to the multiple multiplexers to route the first image data onto the set of data lines; and the display driver integrated circuit does not send control signals to the multiple multiplexers, between the sending of the first scan signal and the sending of the second scan signal, to route image data onto the set of data lines.

Embodiment 10 is the method of embodiment 9, wherein: the display driver integrated circuit receives second image data that is for a second portion of the first frame of image content and that is designated for the second line of pixels; and the second image data is not routed to the set of data lines by the multiple multiplexers, due at least in part to the display driver integrated circuit not sending control signals to the multiplexers, between the sending of the first scan signal and the sending of the second scan signal, to route image data onto the set of data lines.

Embodiment 11 is the method of any of the preceding embodiments, wherein presenting the first frame of image content includes: addressing the set of data lines with third image data for a third portion of the first frame of image content: sending a third scan signal to a third line of pixels of the array of pixels, using a third scan line of the set of scan lines, to move the third image data from the set of data lines to the third line of pixels: activating the third line of pixels to emit light after the third scan signal has been sent to the third line of pixels: sending a fourth scan signal to a fourth line of pixels of the array of pixels, using a fourth scan line of the set of scan lines, without having addressed the set of data lines with image data after having addressed the set of data lines with the third image data; and activating the fourth line of pixels to emit light after the fourth scan signal has been sent to the fourth line of pixels.

Embodiment 12 is the method of any of the preceding embodiments, wherein the display device sends the second scan signal to the second line of pixels without having addressed the set of data lines with image data, as a result of the display device operating in a reduced-resolution mode of operation.

Embodiment 13 is the method of embodiment 12, wherein the display device receives a signal indicating that the display device is to switch from a higher-resolution mode of operation to the reduced-resolution mode of operation as a result of a battery of a device in which the display device is housed being determined to have a power level that fell below a threshold power level.

Embodiment 14 is the method of any one of embodiments 1 to 10, wherein: the display device presents the first frame of image content while the display device is in a reduced-resolution mode of operation: the method comprises receiving a signal indicating that the display device is to switch from the reduced-resolution mode of operation to a higher-resolution mode of operation that is adapted to present image content with higher resolution than when the display device is in the reduced-resolution mode; and the method comprises presenting, by the display device, a second frame of image content while the display device is in the higher-resolution mode of operation, including by: addressing the set of data lines with third image data for a first portion of the second frame of image content; sending a third scan signal to the first line of pixels, using the first scan line of the set of scan lines, to move the third image data from the set of data lines to the first line of pixels; activating the first line of pixels to emit light after the third scan signal has been sent to the first line of pixels: addressing the set of data lines with fourth image data for a second portion of the second frame of image content: sending a fourth scan signal to the second line of pixels, using the second scan line of the set of scan lines, to move the fourth image data from the set of data lines to the second line of pixels; and activating the second line of pixels to emit light after the fourth scan signal has been sent to the second line of pixels.

Embodiment 15 is the method of any one of embodiments 13 or 14, wherein: the reduced-resolution mode of operation of the display device provides a same horizontal resolution as the higher-resolution mode of operation; and the reduced-resolution mode of operation of the display device provides a decrease in vertical resolution with respect to the higher-resolution mode of operation.

Embodiment 16 is the method of embodiment 15, wherein: the decrease in vertical resolution provided by the reduced-resolution mode of operation with respect to the higher-resolution mode of operation results from the display device not addressing the set of data lines with image data, after the first scan signal is sent to the first line of pixels and before sending the second scan signal to the second line of pixels.

Embodiment 17 is the method of any one of embodiments 14, 15 or 16, wherein: addressing the set of data lines with image data involves using multiplexers to route image data to the set of data lines; and the reduced-resolution mode of operation is adapted to consume fewer power resources than the higher-resolution mode of operation as a result of the multiplexers not routing image data to the set of data lines for a portion of lines of pixels in the array of pixels.

Embodiment 18 is directed to a display device, comprising: an array of pixels comprising multiple pixel rows: a set of data lines: a set of scan lines, each scan line corresponding to one of the multiple pixel rows; and a controller configured to perform operations comprising: operating the display device in a first resolution mode comprising addressing, using the set of data lines and the set of scan lines, all pixel rows of the multiple pixel rows with first image data for a first frame of image content; and operating the display device in a second resolution mode comprising addressing, using the set of data lines and the set of scan lines, fewer than all pixel rows of the multiple pixel rows with second image data for a second frame of image content.

Embodiment 19 is the display device of embodiment 18, wherein addressing all pixel rows of the multiple pixel rows with the first image data for the first frame of image content comprises: sending scan signals sequentially to each of the multiple pixel rows using the set of scan lines; and writing a portion of the first image data to the set of data lines prior to sending each scan signal and after sending an immediately previous scan signal.

Embodiment 20 is the display device of embodiment 18, wherein addressing all pixel rows of the multiple pixel rows with the first image data for the first frame of image content comprises: sending scan signals sequentially to each of the multiple pixel rows using the set of scan lines, including: sending a first scan signal to a first pixel row of the multiple pixel rows; and sending a second scan signal to a second pixel row of the multiple pixel rows, the second pixel row being an immediately next pixel row after the first pixel row, without writing image data to the set of data lines between sending the first scan signal and sending the second scan signal.

In another embodiment, there is provided a display device, comprising an array of pixels comprising multiple pixel rows, a set of data lines, a set of scan lines, each scan line corresponding to one of the multiple pixel rows and a controller configured to perform operations comprising the method of embodiment 1 and its optional features.

The details of one or more implementations are set forth in the accompanying drawings and the description below. Other features, objects, and advantages will be apparent from the description and drawings, and from the claims.

DETAILED DESCRIPTION

This document generally describes mechanisms for providing a display device that can operate at different resolutions.

Figure 1:
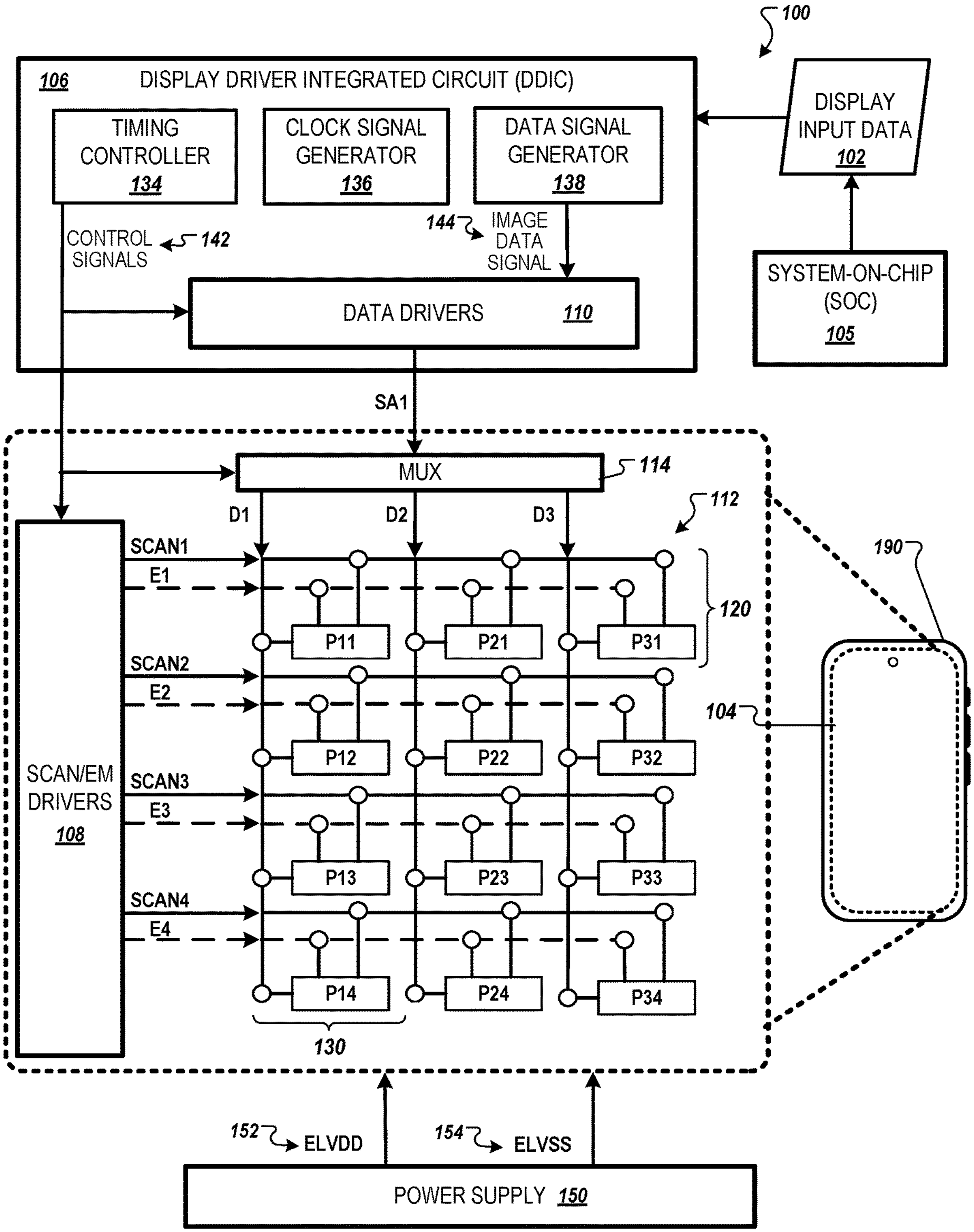
FIG. 1 shows a diagram of an example display system of an electronic device.

FIG. 1 is a diagram of an example display system 100 of computing device 190. The display system 100 is an OLED display system that includes an array 112 of light emitting pixels. Each light emitting pixel includes an OLED. The OLED display is driven by drivers, including SCAN/EM drivers 108 and data drivers 110. The SCAN/EM drivers 108 can be integrated, i.e., stacked, row line drivers. In general, the data drivers 110 provide data signals (e.g., voltage data (VDATA)) to the to the data lines (e.g., D1-D3), the SCAN/EM Drivers 108 provides a SCAN signal to a selected one of the scan lines (e.g., SCAN1) move the data signals from the data lines to the pixels in the selected scan line, and the SCAN/EM Drivers 108 provide an EMISSION signal to a selected one of the emission lines (e.g., E1) to light the OLEDs in the selected row according to image data specified by the data signals. Although FIG. 1 illustrates the display system 100 having the SCAN/EM drivers 108 on a single side of the display, the SCAN/EM drivers 108 can be placed on both left and right sides of the display to improve driving performance (e.g., increasing speed by having SCAN drivers on the left side of the display and the EM drivers on the right side of the display).

The pixel array 112 includes a plurality of light emitting pixels, for example, the pixels P11 through P34. A pixel is a small element of a display that can change color based on the image data supplied to the pixel. Each pixel includes an OLED and circuitry to address the OLED with a data value, store the data value, and drive the OLED at an intensity based on the data value (e.g., the components shown in FIG. 2A). Each pixel within the pixel array 112 can be addressed individually to produce various intensities of a color produced by the pixel.

Each pixel maintains a mostly steady luminance throughout a frame time, displaying light corresponding to the supplied image data. A frame time, or frame period, is an amount of time between a start of a frame and a start of a next frame. The frame time can be the inverse of a frame rate of a display system. For example, a frame rate of 60 frames per second (fps) corresponds to a frame time of one-sixtieth of a second, or 0.0167 seconds.

The pixel array 112 extends in a plane and includes rows and columns. Each row extends horizontally across the pixel array 112. For example, the first row 120 of the pixel array 112 includes pixels P11, P21, and P31. Each column extends vertically down the pixel array 112. For example, the first column 130 of the pixel array 112 includes pixels P11, P12, P13, and P14. Only a few pixels are shown in FIG. 1 for simplicity. In practice, there may be thousands or millions of pixels in the pixel array 112. Increasing the numbers of pixels in a display that remains the same size results in a higher image resolution.

The display system 100 includes a display driver integration circuit (DDIC) 106 that receives display input data 102. In some examples, the DDIC 106 receives the display input data 102 from a system-on-chip (SoC) 105. The DDIC 106 can be, for example, a semiconductor integrated circuit or a state machine. The DDIC 106 generates signals with suitable voltage, current, timing, and demultiplexing to cause the display panel 104 to show images according to display input data 102. In some examples, the DDIC 106 can be a microcontroller and may incorporate RAM, Flash memory, EEPROM, ROM, etc.

The DDIC 106 includes a timing controller 134, a clock signal generator 136, and a data signal generator 138. The DDIC 106 generates control signals 142. The control signals 142 can include, for example, signals that control a display frame start time and a display frame stop time of each frame presented by the display panel 104, where a frame represents a single image in a sequence of images that are presented by the display panel 104. In examples in which each frame presented by the display panel includes multiple emission cycles, the control signals 142 or other signals not illustrated in FIG. 1 can control a display emission start time and a display emission stop time of each emission cycle of the display panel 104.

In some examples, the SCAN/EM drivers 108, the data drivers 110, or both, can be integrated with the DDIC 106. The SCAN/EM drivers supply SCAN and EM signals to rows of the pixel array 112. For example, the SCAN/EM drivers 108 supply scan signals via scan lines S1 to S4, and EM signals via EM lines E1 to E4, to the rows of pixels, with each row of pixels in the pixel array 112 being addressed by a scan line and a corresponding emission line. For example, the first row 120 of the pixel array 112 is addressed by scan line SCAN1 and emission line E1.

The data drivers 110 supply signals to columns of the pixel array 112. For example, based on the image data signal 144 from the data signal generator 138, the data drivers 110 output data values via source amp output signal lines SAN (e.g., a set of source amp signal lines SA1, SA2, and SA3) to a set of multiplexers 114 in the panel 104. The set of multiplexers 114 in the panel 104 receive data values from a corresponding set of source amp output signal lines SAN, and route the received data values among a greater number of data lines. For example, FIG. 1 illustrates a single MUX 114 that is configured to receive a stream of data values from the data driver 110 via the source output signal line SA1, and distribute the stream of data values one at a time among the data signal lines D1-3. In practice there would likely be multiple MUXs, each being fed with data values from the data drivers 110 via a corresponding source control signal line. Operations of the multiplexers 114 are described in greater detail with reference to FIG. 3A.

The data drivers 110 supply data voltages via the data lines D1 to D3. In some examples, each of the data lines D1 to D3 represent multiple data lines. For example, the pixel P11 can include three subpixels (e.g., P11R for a red subpixel, P11G for a green subpixel, and P11B for a blue subpixel), and the data line D1 can represent three corresponding data lines, each addressing a corresponding subpixel of pixel P11.

The control signals 142 can be used to drive the SCAN/EM drivers 108 and the data drivers 110. Thus, the DDIC 106 controls the timing of the scan signals, EM signals, and data signals.

The display system 100 includes a power supply 150. The power supply 150 provides a first supply voltage ELVDD and a second supply voltage ELVSS, both of which are provided to each pixel in the pixel array 112. In some examples, the power supply 150 can be integrated with the DDIC 106.

Each pixel in the pixel array 112 is addressable by a horizontal scan line, a horizontal EM line, and a vertical data line. For example, the pixel P11 is addressable by the data line D1, the scan line S1, and the EM line E1. In another example, the pixel P23 is addressable by the data line D2, the scan line S3, and the EM line E3.

The scan lines are addressed sequentially for each frame. A scan direction determines an order in which the scan lines are addressed (e.g., a direction in which rows of pixels receive data values and then light up at intensities based on the received data values). In the display system 100, the scan direction is from a top of the pixel array 112 to a bottom of the pixel array 112. For example, the scan line S1 is addressed first, followed by the scan line S2, then S3, etc. In some implementations, all rows of pixels are programmed with data values using SCAN signals (one row at a time), before the display device activates all rows of pixels at intensities based on the programmed data values. In some implementations, a display device may activate rows of pixels while other rows of pixels are still being programmed, such that there is a gap of a few rows between a row currently receiving a SCAN signal and a row of pixels that is activated and begins emitting light.

While FIG. 1 illustrates that each row is addressed by a single scan line, each row may be addressed by multiple scan lines (e.g., nSCAN and pSCAN). Although FIG. 1 illustrates example components of an OLED display, the described techniques may be applied to other flat panel display technologies that include an array of pixels. For example, the technology may be applied to light emitting diode (LED), liquid crystal displays (LCD), and plasma display panels (PDP).

Figure 2A:
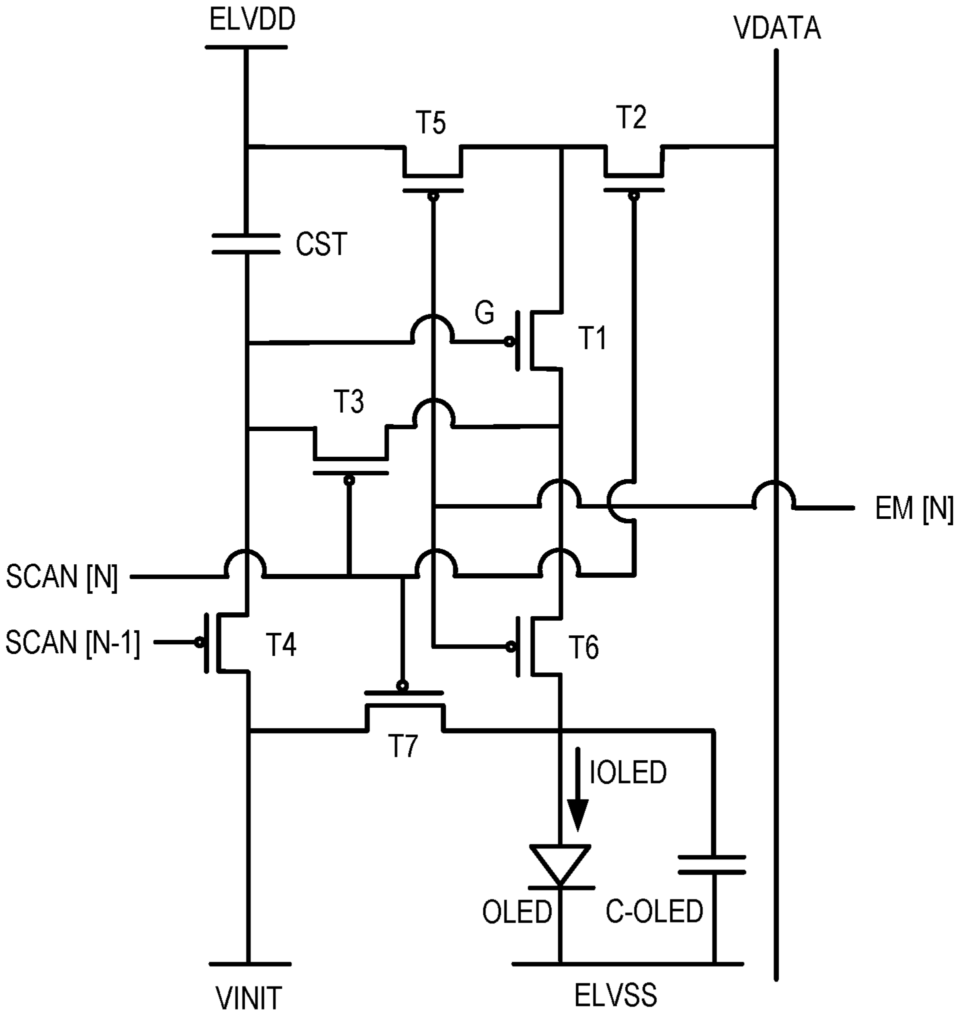
FIGS. 2A-B show a diagram of a pixel circuit of a display device and a corresponding timing diagram.

FIG. 2A shows a diagram of a pixel circuit of a display device, which pixel circuit includes an LED and corresponding drive circuitry for the pixel circuit. FIG. 2A may illustrate a more detailed view of a single pixel from the array of pixels shown in FIG. 1. While this disclosure sometimes refers to the components shown in FIG. 2A as a “pixel circuit”, this disclosure may also refer to such components as simply a “pixel.” Further, the pixel shown in FIG. 2A can represent a sub-pixel.

The pixel circuit may be an active matrix OLED (AMOLED) pixel circuit. The pixel circuit receives an emission signal (EM) on an emission line, SCAN signals on scan signal lines, and a data voltage (VDATA) signal on a data line. The pixel circuit 200 receives a first supply voltage ELVDD on a first voltage supply line, a second supply voltage ELVSS on a second voltage supply line, and an initial reference voltage VINIT on an initial voltage supply line.

The pixel circuit includes an organic light-emitting diode (OLED). The OLED includes a layer of an organic compound that emits light in response to an electric current, IOLED. The organic layer is positioned between two electrodes: an anode and a cathode. The OLED is driven by a driving transistor T1, which receives the supply voltage ELVDD and acts as a current source that drives the OLED to emit light.

The pixel also includes a storage capacitor CST and transistors T2 through T7. The operation of the pixel is defined by states of the control signals SCAN, EM, and VDATA. An amount/level of the OLED current (IOLED) is set by a voltage present at a gate terminal of the driving transistor T1, referred to herein as the “G” node.

The driving transistor T1 has a threshold voltage VTH between the gate terminal of the driving transistor T1 and a source terminal of the driving transistor T1. If the voltage between the gate terminal and the source terminal is above the threshold voltage VTH, the driving transistor T1 creates a conducting path from the source terminal to the drain terminal. An amount of current IOLED that flows through the conducting path through the driving transistor T1 corresponds to an amount that the voltage between the gate terminal and the source terminal is above the threshold voltage VTH.

Figure 2B:
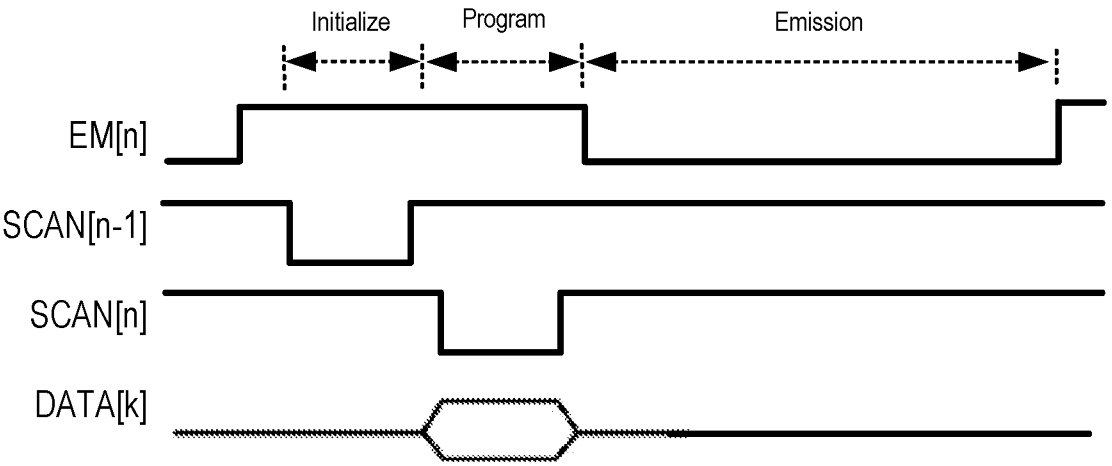

FIG. 2B shows a timing diagram of the control signals provided to and received by the pixel shown in FIG. 2A. These control signals repeatedly transition during operation of the display system 100 between an initialization stage, a programming stage, and an emission stage.

At an end of an emission stage, the EM signal transitions to an off state (e.g., by changing from a low state to a high state). This transition turns off transistors T5 and T6, which interrupts current being provided from ELVDD to the OLED, therefore stopping light emission by the OLED. Since the EM signal may be provided to an entire line of pixels, this transition can turn off all pixels in the line of pixels.

During the initialization stage, the SCAN[n−1] signal turns to an on state (e.g., by changing form a high state to a low state), which turns on transistor T4 for a period of time and initializes the G node to the initialization voltage VINIT. Since the SCAN[n−1] signal may be provided to an entire line of pixels, this initialization stage can erase the data values that were previously stored at each pixel in the line of pixels. The SCAN[n−1] signal may be the SCAN[n] signal provided to a preceding row by a state machine of the SCAN/EM drivers 108.

During the programming stage, the SCAN[n] signal turns to an on state (e.g., by going low), which turns on transistors T2, T3, and T7 for a period of time. This causes the voltage value at the voltage data VDATA line to pass through transistors T2, T1, and T3 to the G node, setting the G node to a value based on the VDATA line (e.g., the voltage at VDATA minus an effect of transistor threshold voltages). Since the SCAN signal may be provided to an entire line of pixels, this programming stage can cause each pixel in the line of pixels to move data voltage values from each pixel's respective data line to the G node of the respective pixel.

During the emission stage, the EM signal turns to an on state (e.g., by going low), which turns on transistors T5 and T6. Current flows from ELVDD through transistors T5, T1, and T6 to an anode of the OLED. Since the EM signal is provided to an entire line of pixels, all pixels in the line of pixels may activate.

A current level provided to the OLED in each pixel is determined by the voltage present at the G node of the pixel (e.g., with the G node voltage level having been programmed by the voltage data VDATA line). An intensity or brightness of light emitted by the OLED directly correlates to an amount of electrical current IOLED applied to the OLED, with higher current corresponding to a greater intensity of light than a lower current. The storage capacitor CST maintains the voltage at the G node, so that the OLED continues to emit light at roughly the same level for a duration of the emission stage.

The voltage at the G node may decrease slightly during the emission stage. As such, the current IOLED applied to the OLED and the intensity of light emitted by the OLED may decrease or increase slightly during the emission stage, depending on a type of pixel circuit design (e.g., with p-channel transistors in the pixel circuit, lower voltage levels at the G node cause higher IOLED and higher intensity of OLED light).

Figure 3A:
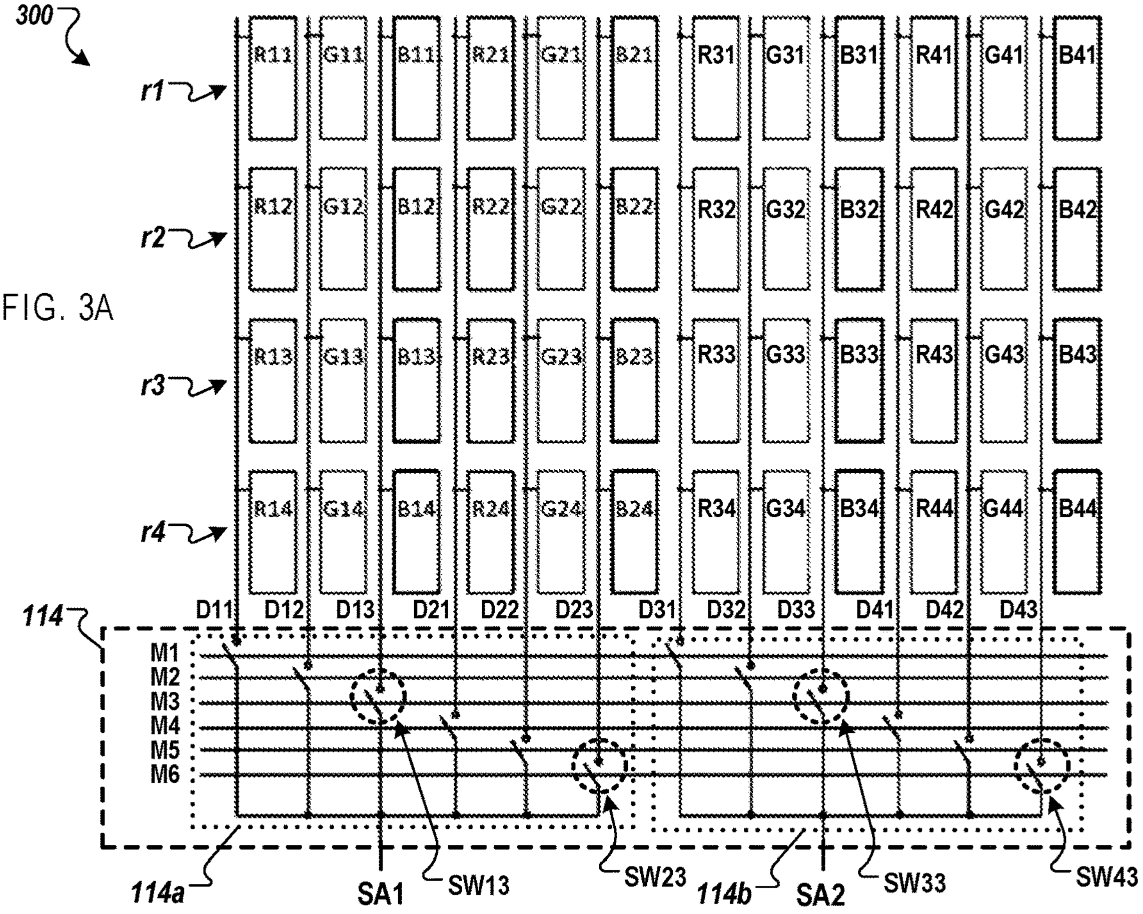
FIG. 3A shows a diagram of a portion of an example display panel circuit including a set of multiplexers.

FIG. 3A shows a diagram of a portion of an example display panel circuit 300 including a set of multiplexers 114. The set of multiplexers 114 includes multiplexer 114*a* and multiplexer 114*b*, each represented by circuitry within respective dotted boxes in FIG. 3A. The multiplexer 114*a* receives, as input, a sequence of image data values on source amp signal line SA1, and selectively routes the sequence of image data values among data lines D11 to D23 (e.g., one data value to D11, then the next data value to D12, then the next data value to D13, and so forth one data value to one data line at a time). Similarly, the multiplexer 114*b* receives, as input, a sequence of image data values on source amp signal line SA2, and selectively routes the sequence of image data values to data lines D31 to D43.

The display panel circuit 300 includes pixel rows r1, r2, r3, r4. Each pixel row is illustrated as including two pixels that each include a red subpixel (R), a green subpixel (G), and a blue subpixel (B). A set of three subpixels forms a pixel. For example, the pixel P11 of FIG. 1 includes subpixels R11, G11, and B11 of FIG. 3A. The pixel P23 of FIG. 1 includes subpixels R23, G23, and B23 of FIG. 3A.

The display panel circuit 300 includes data lines D11 to D43. Each data line addresses a column of subpixels, including a single subpixel from each row. For example, data line D11 addresses subpixel R11 of row r1, subpixel R12 of row r2, subpixel R13 of row r3, and subpixel R14 of row r4. Data line D23 addresses subpixel B21 of row r1, subpixel B22 of row r2, subpixel B23 of row r3, and subpixel B24 of row r4.

High resolution flat panel displays can include large numbers of column data lines. For example, in a watch display having a pixel array that is 384 pixels by 384 pixels, a total of 1152 column data lines can be used to matrix-address the pixel array, with each column data line connecting to the DDIC 106. If every column data line was directly connected to the DDIC, the DDIC may be physically large to provide 1152 column data line connections. A large display bezel for line trace design may also be needed in such a design. To reduce the size of the DDIC 106 and the bezel, multiplexers can be used.

Referring to FIG. 3A, the display panel circuit 300 includes multiplexer activation lines M1 to M6 that are each used to control the operation (e.g., the on/off status) of one or more transistor switches of one or more respective multiplexers, based on activation signals received from another component (e.g., the DDIC 106). For example, multiplexer activation line M3 controls the on/off status of switch SW13 in multiplexer 114*a* and switch SW33 in multiplexer 114*b*. Multiplexer activation line M6 controls the on/off status of switch SW23 in multiplexer 114*a* and SW43 in multiplexer 114*b*.

The DDIC 106 outputs image data values on source amp signal lines SA1 and SA2. In the example of FIG. 3A, each source amp signal line connects to a set of six adjacent data lines via a multiplexer (e.g., 114*a*, 114*b*). For example, multiplexer 114*a* connects SA1 to data lines D11 to D23 via switches controlled by multiplexer activation lines M1 to M6, respectively. Similarly, multiplexer 114*b* connects SA2 to data lines D31 to D43 via switches controlled by multiplexer activation lines M1 to M6, respectively. Although not shown, additional source amp output lines can connect to additional corresponding sets of six adjacent data lines.

During operation of the display, the DDIC 106 outputs image data (e.g., VDATA) to source amp signal lines SA1 and SA2, for controlling the values of the pixels. For example, the DDIC 106 can output image data for subpixel B11 to a first source amp signal line SA1, while multiplexer activation line M3 is activated to cause the switch SW13 to be in an on-state. The image data provided by source amp signal line SA1 is therefore written to data line D13. When a scan signal turns on for row r1, the image data moves from data line D13 to subpixel B11. When an emission signal activates row r1, subpixel B11 emits light at a brightness and color specified by the image data.

The example set of multiplexers 114 includes two multiplexers, e.g., multiplexers 114*a*, 114*b*, that are each one-to-six multiplexers. A one-to-six multiplexer has six outputs for every one input. Some embodiments include multiplexers with more or fewer outputs per input. For example, a display system can include one-to-ten multiplexers having ten outputs for every one input, or one-to-two multiplexers having two outputs for every one input.

The number of multiplexers included in the set of multiplexers can be proportional to the number of subpixels in the rows of the pixel array, the number of data lines in the display, or both. For example, an example display system having six hundred subpixels per row can have six hundred data lines. The display system can include one hundred one-to-six multiplexers, with each of the multiplexers having outputs connected to six of the data lines.

Figure 3B:
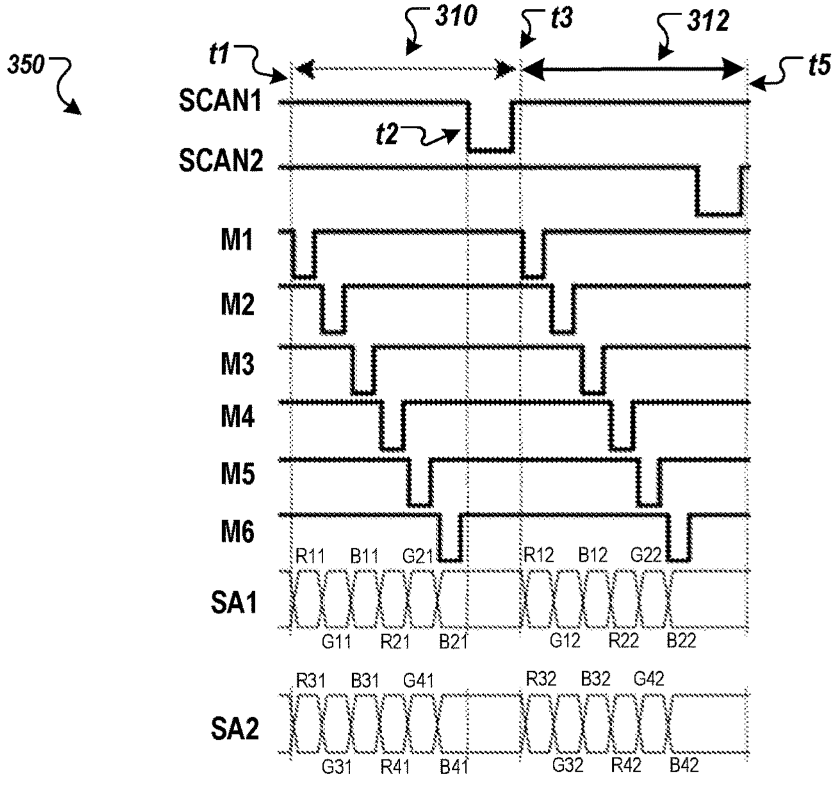
FIG. 3B shows an example timing diagram of the portion of the example pixel circuit of FIG. 3A in a higher-resolution mode.

FIG. 3B shows an example timing diagram 350 for signals sent over lines of a portion of the example display panel circuit 300 of FIG. 3A operating in a higher-resolution mode. During operation in the high resolution mode, the DDIC 106 outputs (on source amp signal lines SA1 and SA2) image data for the subpixels of the pixel circuit 300. The DDIC 106 sends activation signals over the multiplexer activation lines M1 to M6 to route the image data sent over the source amp signal lines SA1 and SA2 among the data lines for the associated pixels.

For example, at time t1, the DDIC 106 outputs image data for subpixel R11 on source amp line SA1 and outputs image data for subpixel R31 on source amp line SA2. At time t1, the DDIC 106 outputs an activation signal on multiplexer activation line M1 to turn on the switches connecting source amp line SA1 to data line D11, and connecting source amp line SA2 to data line D31. The image data for subpixel R11 is therefore written to data line D11, and the image data for subpixel R31 is written to data line D31.

At time t2, the MUXs 114*a* and 114*b* have routed image data among all their respective outputs, therefore writing image data for row r1 to data lines across the pixel array. The scan drivers then turn on scan signal SCAN1, e.g., by setting SCAN1 to a low value. As described with reference to FIGS. 2A and 2B, scan signal SCAN1 turns on transistors T2, T3, and T7 for a period of time for the subpixels in row r1. Scan signal SCAN1 causes multiple image data values on multiple respective data lines to move from the data lines to the respective subpixels of row r1. For example, scan signal SCAN1 causes a first image data value to move from data line D11 to the subpixel R11, and a second image data value to move from data line D31 to subpixel R31. At time t3, the source amp signals SA and SA2 begin outputting image data for the next consecutive row, e.g., outputting image data values for subpixels of row r2.

A time duration between time t1 and time t3 is a row line time 310 for the row r1. In the higher-resolution mode, at each row line time interval, image data for a row of pixels is written to data lines. Thus, the operations of the pixel circuit 300 during row line time 312, between time t3 and time t5, are similar to the operations of the pixel circuit 300 during the previous row line time 310.

During the higher-resolution mode, the DDIC 106 continues to write image data for the subpixels of each consecutive row, from the first row of the pixel array to the last row of the pixel array. At the end of each row line time, a new row line time begins, as image data for the next row is written to the data lines.

The multiplexer activation lines M1 to M6 can have a large parasitic capacitance due to including parallelly connected TFT switches. Additionally, the multiplexer activation signals alternate between high and low voltage states frequently. The voltage difference between high voltage (off) and low voltage (on) states can be, for example, twelve volts or more. As a result, the multiplexer can consume a large amount of power in the display. In some examples, the multiplexer consumes 6.7% of total driving power consumption in a display that is operating in an always-on-display mode.

When a device, e.g., computing device 190, experiences low battery levels, the device may enter a battery saver mode. In some examples, the computing device 190 can enter a battery saver mode in response to receiving user input indicating a selection of battery saver mode. In some examples, in a battery saver mode, the display screen contents can be simplified, and may include non-color images. This can reduce power consumption of the computing device 190. However, the power consumed by the display circuitry may not be reduced if the display remains in an AOD condition, partially due to the multiplexers in the display continually switching transistors to route image data among data lines.

Figure 4:
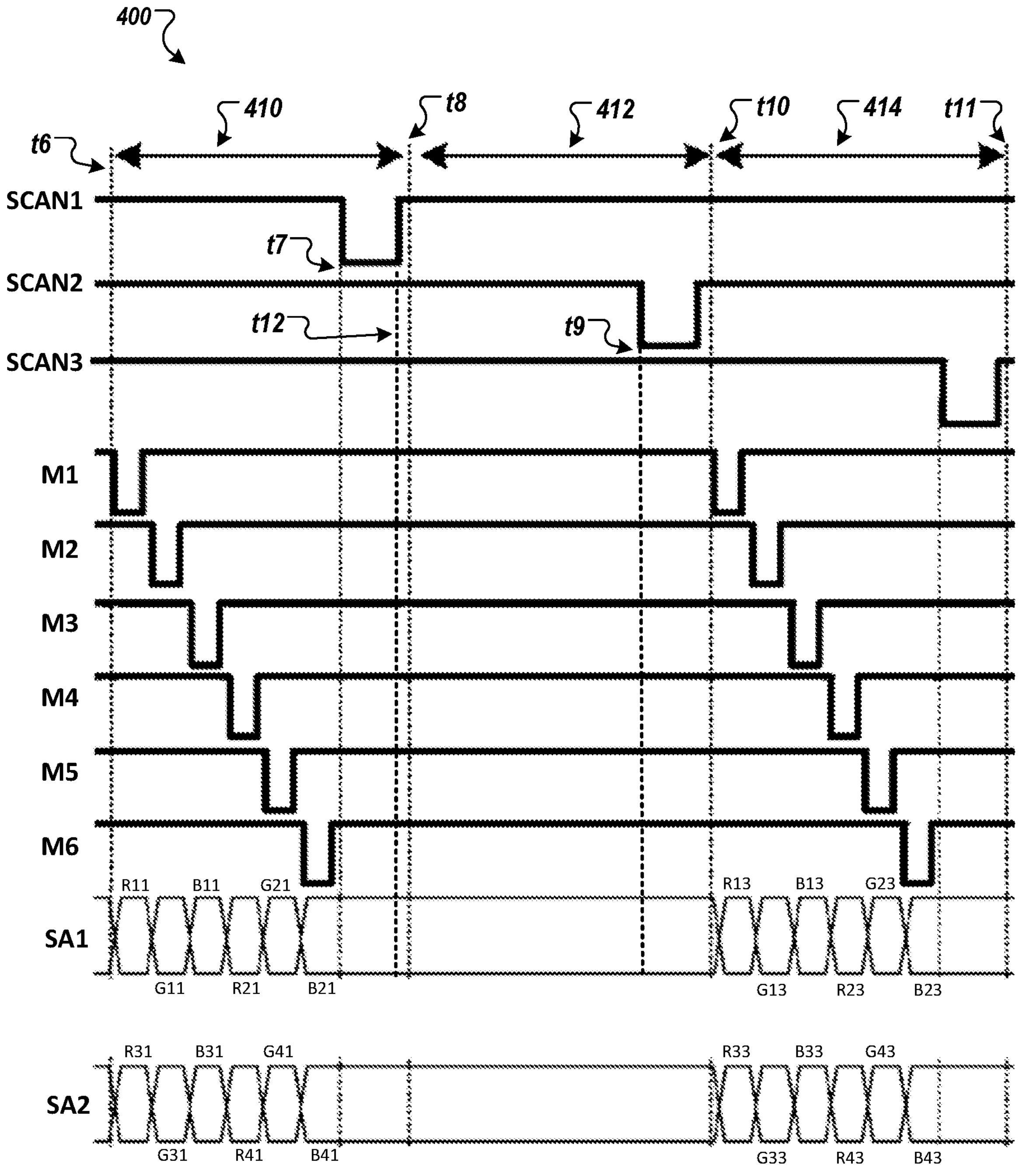
FIG. 4 shows an example timing diagram of the portion of the example pixel circuit of FIG. 3A in a reduced-resolution mode.

FIG. 4 shows an example timing diagram 400 of the portion of the example panel display circuit 300 of FIG. 3A operating in a reduced-resolution mode. In the timing diagram 400, during the first row line time 410 between t6 and t8, the operations of the pixel circuit 300 are the same as during the first row line time 310 of timing diagram 350 of FIG. 3B. For example, at time t6, DDIC output line SA1 includes image data for subpixel R11, and output line SA2 includes image data for subpixel R31. At time t6, the DDIC 106 outputs an activation signal on multiplexer activation line M1, to turn on the switches connecting source amp line SA1 to data line D11, and connecting source amp line SA2 to data line D31. The image data for subpixel R11 is therefore written to data line D11, and the image data for subpixel R31 is written to data line D31.

At time t7 of timing diagram 400, similar to time t2 of timing diagram 350, all MUX switches have cycled on and off, writing image data for row r1 to data lines across the pixel array. The scan drivers turn on scan signal SCAN1. Scan signal SCAN1 causes the image data to move from the data lines to the respective subpixels of row r1. For example, scan signal SCAN1 causes image data to move from data line D11 to the subpixel R11 and from data line D31 to subpixel R31.

At time t8, the source amp signal lines SA1 and SA2 are not providing any image data to the subpixels of row r2, which is the next consecutive row after row r1. The DDIC 106 controls the source amp signal lines SA1 and SA2 to remain in an off, or idle state during row line time 412 between time 18 and time t10. In some examples, setting the source amp signal lines SA1 and SA2 to an off state can include disconnecting the source amp signal lines SA1 and SA2 such that the source amp signal lines are not connected to the multiplexers 114 (or that the source amp signal lines SA1 and SA2 are connected to the multiplexers 114, but are disconnected from the DDIC 106 such that corresponding output terminals of the DDIC 106 are disconnected from internally circuitry and therefore "float").

The DDIC 106 controls the multiplexer activation lines to remain in an "off" state during the row line time 412 between time 18 and time t10. Therefore, the multiplexer switches stay open, or off, and do not toggle during the row line time 412. Thus, no image data is written to the data lines for the row r2 during the row line time 412.

At time t9, the scan drivers turn on scan signal SCAN2, which is sent over a scan signal line to every pixel in row r2. Scan signal SCAN2 turns on transistors T2, T3, and T7 for a period of time for the subpixels in row r2. Since no new image data has been written to the data lines during row line time 412, image data that may move from the data lines to the subpixels of row r2 may represent decayed versions of image data that was provided to the data lines between times t6 and t7. For example, the data values provided to the data lines between times 16 and t7 may remain on those data lines after the SCAN1 activation temporarily connects those data lines to corresponding pixels of row r1 to program those pixels with corresponding data values.

When scan signal SCAN2 turns on, and no new data has been written to the data lines for the subpixels in row r2, the subpixels in row r2 receive, from the data lines, a residual voltage that remains from previous image data, e.g., the image data that was written to the data lines for row r1 and that may have decayed an amount that is not perceptible to an end user viewing the display. The effects of scanning a row without first writing new data for the row are described in greater detail with reference to FIG. 5.

At time t10, the DDIC 105 resumes writing image data to the next consecutive row (e.g., subpixels of row r3) on source amp signal lines SA1 and SA2. During row line time 414 between time t10 and time t11, the multiplexer switches controlled by multiplexer activation lines M1 to M6 cycle on and off in sequence, writing image data for the subpixels of row r3 to the data lines.

During the reduced-resolution mode, the pattern shown in timing diagram 400 repeats, with the DDIC 106 writing image data for alternating pixel rows. In the example pixel circuit 300, the DDIC 106 writes image data for row r1 and r3, and skips writing image data for row r2 and r4. Thus, in the reduced-resolution mode, the display system operates at a half frequency for multiplexer operations as well as a half frequency of the DDIC 106 outputting image data using source amp signal lines SA1 and SA2. The multiplexers 114 and circuitry in the DDIC 106 that pushes image data out to the source amp signal lines SA1 and SA2 are idle during alternating row line times.

Operating the display at a reduced-resolution mode, including operating at a half frequency for multiplexer operations and at a half frequency for DDIC source amp signals, can reduce the multiplexer and source amp power consumption, e.g., to approximately half of the power consumption used in the higher-resolution mode. Operating the display in the reduced-resolution mode can cause visual quality degradation, due to reducing the vertical resolution of the display image by half (e.g., such that each set of two rows may show a same/copied row of image content, with half as much unique pixel content presented by the display). The reduced-resolution mode can be implemented by a battery saver mode, such that the reduced visual quality of the images is imperceptible to the user.

Though the example timing diagram 400 shows image data being written to alternating pixel rows beginning with a first row r1, other variations of reduced-resolution modes are possible. In some examples, the image data can be written to alternating pixel rows beginning with a second row r2. For example, the DDIC 106 can write image data for row r2 and r4, and skip writing image data for row r1 and r3. In some examples, the multiplexer signals toggle only for odd-numbered pixel rows, or only for even-numbered pixel rows.

In some examples, the DDIC 106 can skip writing image data for two or more consecutive rows. For example, the DDIC 106 can write image data for row r1, can skip writing image data for rows r2 and r3, and can write image data for row r4. Skipping writing image data for two or more consecutive rows can reduce power consumption by reducing image resolution, compared to skipping only every other row. In some examples, the DDIC 106 can enter a first reduced-resolution mode in which individual rows are skipped between rows of new image data. The SoC may determine that further reduction of power consumption is required, and can instruct the DDIC 106 to enter a second reduced-resolution mode, in which more than one row is skipped between rows of new image data.

In some examples, the DDIC 106 can write image data for two or more consecutive rows. For example, the DDIC 106 can write image data for rows r1 and r2, and can skip writing image data for row r3. Writing image data for two or more consecutive rows can increase image resolution by increasing power consumption, compared to writing image data for single alternating rows.

Though the example timing diagram 400 shows both the multiplexer switches and the source amp signals being idle during row line time 412, other variations are possible. In some examples, the DDIC 106 can idle the multiplexer switches during row line time 412, without idling the source amp outputs. For example, multiplexer circuits M1 to M6 can maintain the multiplexer switches in an off state, while the DDIC 106 continues to output data values on source amp signal lines SA1 and SA2. In these examples, the multiplexers 114 receive the data values on the source amp signal lines SA1 and SA2, but do not route the image data to any of the data lines.

In some examples, the DDIC 106 can idle the source amp outputs during row line time 412, without idling the multiplexer switches. For example, the DDIC 106 can turn off circuitry that image data on source amp signal lines SA1 and SA2, while activation signals are sent on the multiplexer activation lines M1 to M6 to turn the multiplexer switches on and off in sequence. In these examples, the MUX continues to cycle, but provides no new image data to the data lines.

When a scan signal turns on for a particular row, and no new data has been written to the data lines for the subpixels in a particular row, the subpixels in the particular row receive, from the data lines, a residual voltage that remains from previous image data.

The data lines D11-D43 of the example pixel circuit 300 each have a parasitic capacitance (CDATA). The CDATA of each data line D11-D43 can be used as a temporary storage for image data (VDATA) before the SCAN signals become active. For example, image data is written to data line D11 at time t6, and the scan signal SCAN1 turns on at time t7. Between time t6 and t7, the image data for subpixel R11 is stored by the CDATA of D11.

After the image data is written to a pixel circuit by a SCAN signal, the CDATA can continue to store the image data because the CDATA is generally much larger than the CST in the pixel circuit and the charge that CDATA transfers to the CST may cause a small decay in the voltage levels in the CDATA. For example, after scan signal SCAN1 turns off at t12, the CDATA of D11 continues to store an amount (e.g., voltage) of the image data that was written for subpixel R11. The image data stored by CDATA can decay over time.

When the next row SCAN becomes active, the remaining charges in the CDATA can be reused for charging the storage capacitor (CST) of the subpixel of the next row. For example, scan signal SCAN2 turns on at time t9. The residual image data from data line D11 moves to subpixel R12. Similarly, the residual image data from data line D12, which is decayed from the image data written for subpixel G11, moves to subpixel G12. In this way, the subpixels in row r2 receive, from their respective data lines, a decayed version of image data that was written for the subpixels in row r1. Similarly, the subpixels in row r4 receive, from their respective data lines, a decayed version of image data that was written for the subpixels in row r3.

Figure 5:
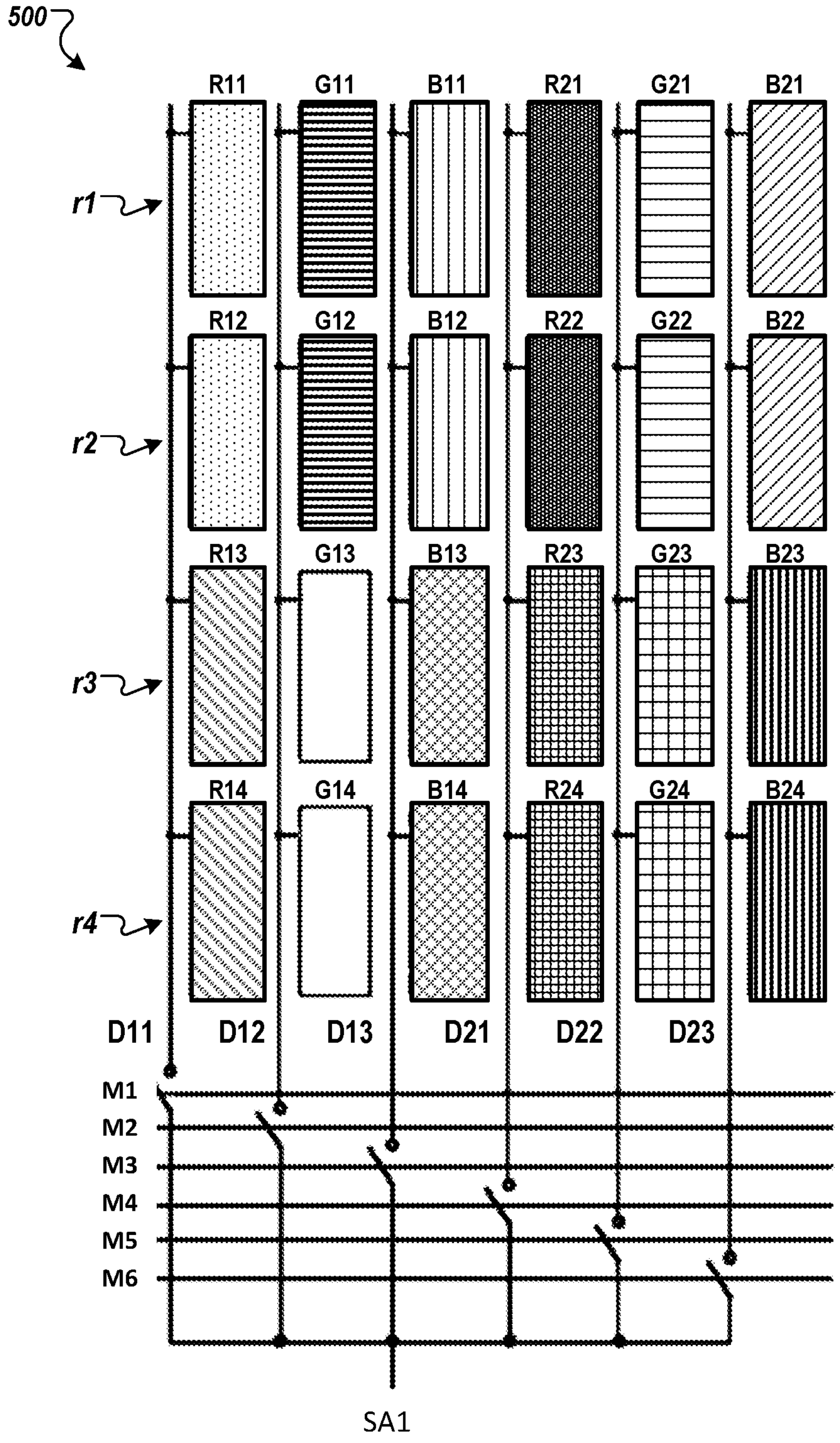
FIG. 5 shows a diagram of a portion of an example pixel circuit in a reduced-resolution mode.

FIG. 5 shows a diagram of a portion of an example pixel circuit 500 in a reduced-resolution mode. In the example display panel circuit 500, new image data is written to the data lines during the row line times for rows r1 and r3. No new image data is written to the data lines during the row line times for rows r2 and r4. Thus, each subpixel in row r2 receives, from its respective data line, a decayed version of image data that was written for the subpixel in row r1 that is connected to the same data line. Each subpixel in row r4 receives, from its respective data line, a decayed version of image data that was written for the subpixel in row r3 that is connected to the same data line.

As a result of writing new image data for alternating pixel rows in reduced-resolution mode, the pixels of the pixel circuit 500 have half the vertical image resolution, compared to a higher-resolution mode in which new image data is written for every pixel row. In FIG. 5, different pixel values, e.g., values of pixel luminance, are represented by different patterns. As shown in FIG. 5, the subpixels in row r2 emit light at approximately the same pixel values as the subpixels in row r1. Thus, the appearance of the subpixels in row r2 is similar to the appearance of the subpixels in row r1. The subpixels in row r4 emit light at approximately the same pixel values as the subpixels in row r3. Thus, the appearance of the subpixels in row r4 is similar to the appearance of the subpixels in row r3.

While circuitry in the DDIC 106 may be configured to operate in the reduced-resolution mode, there may also exist circuitry in and/or programming executed by the system-on-chip (SOC) that provides image data to the DDIC 106 that is configured to operate in the reduced-resolution mode. For example, the SOC may perform a determination to enter the reduced-resolution mode (e.g., as a result of remaining battery capacity falling below a threshold level), and as a result the SOC may: (1) send a signal to the DDIC 106 to cause the DDIC 106 to enter the reduced-resolution mode, and (2) generate frames of image content that have a reduced horizontal resolution, such that the frames of image content sent by the SOC to the DDIC 106 have half the number of rows of unique image content. The DDIC 106 can vertically spread that reduced amount of image content out over the entire display using the techniques described herein. SOC power consumption may reduce during its reduced-resolution mode, at least partially due to the SOC generating frames of image content to send to the DDIC 106 that have a lower resolution (e.g., because half the image content is prepared by processing circuitry, and because half the image content is amplified for transmission over signal lines to the DDIC 106).

Figure 6A:
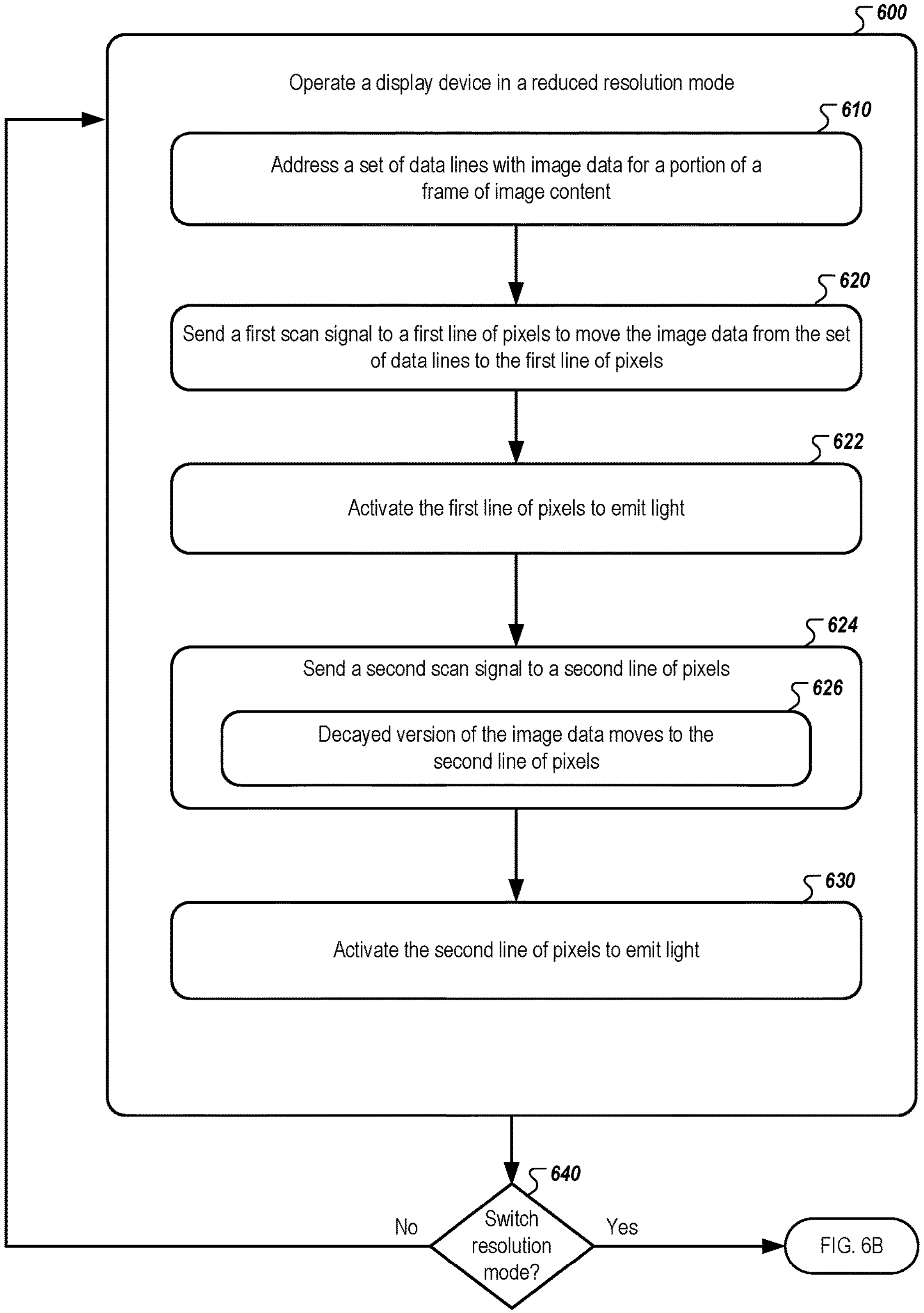
FIGS. 6A-B show a flowchart of a process for operating a display device with different resolutions Like reference symbols in the various drawings indicate like elements.
Figure 6B:
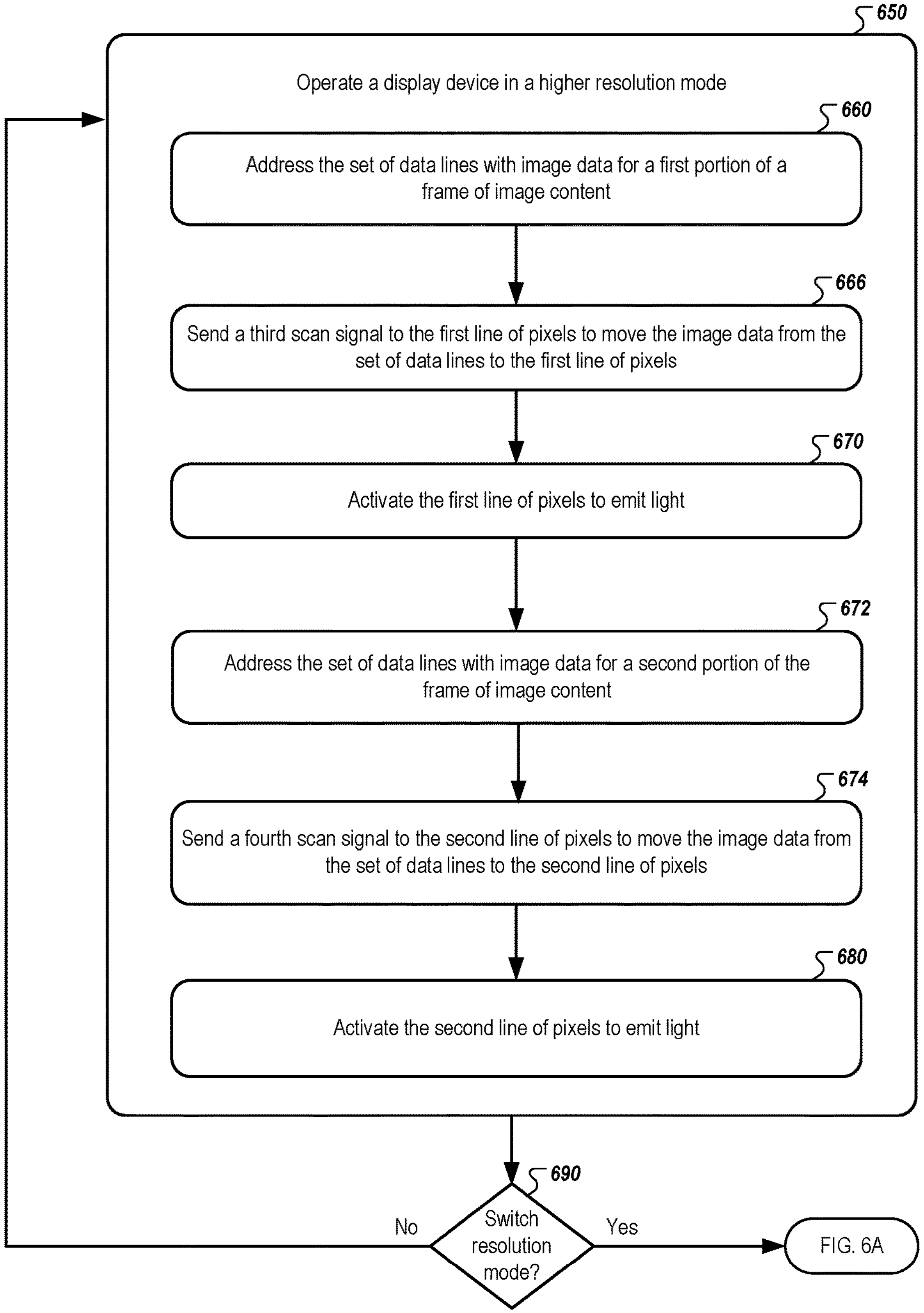

FIGS. 6A-B show a flowchart of a process for operating a display device or system with different resolutions. The process can be implemented by a display system or a computing device that includes the display system, e.g., computing device 190.

At box 600, a display device operates in a reduced-resolution mode. For example, the DDIC 106 can receive a signal from the SoC 105 instructing the DDIC 106 to enter a reduced-resolution mode. In some examples, the DDIC 106 receives a signal from the SoC 105 indicating that the device 190 has entered a battery saver mode. In response to receiving the signal indicating that the device 190 has entered the battery saver mode, the DDIC can determine to operate in the reduced-resolution mode. The operations of boxes 610-630 (discussed below) may be performed while the display device is operating in the reduced-resolution mode.

At box 610, the display device addresses a set of data lines with image data for a portion of a frame of image content. For example, the DDIC 106 can address a set of data lines including data lines D11 to D43 (FIG. 3A) with image data for a portion of a first frame of image content. In some examples, the first portion of the first frame of image content is a first line of image content from the first frame of image content.

In some examples, addressing the set of data lines with the image data includes using multiple multiplexers to route the image data to the set of data lines. For example, the DDIC can address the set of data lines using the set of multiplexers 114. Each multiplexer of the set of multiple multiplexers 114 is configured to route image data to a corresponding subset of data lines within the set of data lines. For example, the multiplexer 114*a* (FIG. 3A) receives a stream of image data over source amp line SA1 and routes the image data to a subset of data lines including data lines D11 to D23 (e.g., with each image data value in the stream of image data being routed one-at-a time to different data lines in a collection of data lines, repeatedly in a cyclical manner. The multiplexer that receives image data over source amp line SA2 routes image data to a subset of data lines including data lines D31 to D43.

The multiple multiplexers receive first image data from a DDIC that is a component of the display device. For example, the set of multiplexers 114 receives first image data via source amp lines SA1 and SA2 from the DDIC 106. The display device addresses the set of data lines D11 to D43 with the first image data. In some examples, the DDIC 106 sends control signals 142 (e.g., the above-discussed multiplexer activation signals) to the multiple multiplexers to route the first image data onto the set of data lines. In some examples, the first image data includes a set of voltages (VDATA) that each define an intensity at which a corresponding pixel in the first line of pixels is to emit light. For example, a series of image data values provided to the multiplexer 114*a* via source amp signal line SA1 includes a set of voltages defining the intensities at which the subpixels R11 to G21 of the row r1 are to emit light.

At box 620, the display device sends a first scan signal to a first line of pixels to move the image data from the set of data lines to the first line of pixels using a first scan line. For example, the display device can send the scan signal SCAN1 to the subpixels of row r1 to move the image data from data lines D11 to D23 to the subpixels of row r1 (e.g., to the "G" node of each respective subpixel).

At box 622, the display device activates the first line of pixels to emit light after the first scan signal has been sent to the first line of pixels. For example, the display device activates the subpixels of row r1 to emit light after the scan signal SCAN1 has been sent to the subpixels of row r1. The display device can activate the subpixels of row r1 by sending an emission signal using an emission line, e.g., EM line E1 shown in FIG. 1. The first line of pixels emit light at the defined/programmed intensities after the first scan signal has been sent to the first line of pixels. The subpixels R11 to G21 of the row r1 emit light at the defined/programmed intensities after the scan signal SCAN1 has been sent to the subpixels of row r1.

At box 624, the display device sends a second scan signal to a second line of pixels. The second line of pixels may be an immediately next line of pixels in the array of pixels after the first line of pixels. For example, the second line of pixels can include the subpixels of row r2. In some examples, the display device sends the second scan signal using a second scan line (e.g., a conductor that is different from a conductor of the first scan line), without having addressed the set of data lines with image data after having addressed the set of data lines with the first image data. For example, the display device can send the scan signal SCAN2, without having addressed the set of data lines with image data after sending the scan signal SCAN1.

In some examples, the DDIC 106 does not send control signals to the set of multiplexers 114, between sending the first scan signal SCAN1 and sending the second scan signal SCAN2. Thus, the multiplexer switches controlled by multiplexer activation lines M1 to M6 can remain off between the first scan signal SCAN1 and the second scan signal SCAN2. In examples in which each multiplexer switch includes a transistor, for a duration of time between SCAN1 and SCAN2, a voltage present at a gate of the transistor remains below a threshold voltage defined between the gate of the transistor and the source of the transistor, such that the transistor does not establish a conductive path between the source of the transistor and the gate of the transistor. In some examples, after the first scan signal SCAN1 is sent to the first line of pixels, e.g., the subpixels in row r1, the first image data that is addressed to the set of data lines decays in intensity to a decayed version of the first image data.

At box 626, a decayed version of the image data moves to the second line of pixels. In some examples, sending the second scan signal SCAN2 to the second line of pixels, e.g., the subpixels of the row r2, moves the decayed version of the first image data to the second line of pixels. Sending the second scan signal SCAN2 to the second line of pixels is performed by the display device without the multiple multiplexers having routed image data to the set of data lines after the set of data lines was addressed with the first image data.

At box 630, the display device activates the second line of pixels to emit light. For example, the display device can activate the subpixels of row r2 to emit light after the scan signal SCAN2 has been sent to the subpixels of row r2. The display device can activate the subpixels of row r2 by sending an emission signal using an emission line, e.g., EM line E2. The second line of pixels emit light at an intensity defined by the decayed version of the image data received from the corresponding data lines. The subpixels R12 to G22 of the row r2 emit light at the defined intensity after the scan signal SCAN2 has been sent to the subpixels of row r2. The SCAN2 signal may be sent over the second scan line immediately after the SCAN1 signal is sent to the first scan line, in sequence of sending scan lines to scan rows sequentially one-after-another, from display top to display bottom.

At box 640, the display device determines whether to switch resolution modes. For example, the display device can receive a signal indicating that the display device is to switch from the reduced-resolution mode of operation to the higher-resolution mode of operation, for example, as a result of: (i) a battery of a device in which the display device is housed being determined to have a power level that rose above a threshold power level: or (ii) the device receiving user input that turns off the reduced-resolution mode of operation. The computing device or the display device located therein may determine to switch to a higher-resolution mode. If the display device is to not switch resolution modes, the operations of box 600 are performed again. If the display device is to switch to a different resolution mode, and the different resolution mode is to be a higher-resolution mode, the operations of box 650 are performed, as shown in FIG. 6B.

At box 650, the display device operates in a higher-resolution mode. For example, the higher-resolution mode is adapted to present image content with higher resolution than when the display device is in the reduced-resolution mode. In some examples, the higher-resolution mode may be a normal display operating resolution mode. In some examples, the DDIC 106 can receive a signal from the SoC 105 instructing the DDIC 106 to enter a higher-resolution mode. In some examples, the DDIC 106 receives a signal from the SoC 105 indicating that the device 190 has exited a battery saver mode. In response to receiving the signal indicating that the device 190 has exited the battery saver mode, the DDIC can determine to operate in the higher-resolution mode.

At box 660, the display device addresses the set of data lines with image data for a first portion of a frame of image content. For example, the DDIC 106 can address the set of data lines including data lines D11 to D43 with image data for a portion of a frame of image content. In some examples, the first portion of the frame of image content is a first line of image content from the frame of image content.

At box 666, the display device sends a third scan signal to the first line of pixels to move the image data from the set of data lines to the first line of pixels using the first scan line. For example, the display device can send a scan signal to the subpixels of row r1 to move the image data from data lines D11 to D23 to the subpixels of row r1.

At box 670, the display device activates the first line of pixels to emit light after the third scan signal has been sent to the first line of pixels. For example, the display device can activate the subpixels of row r1 to emit light after the third scan signal has been sent to the row r1.

At box 672, the display device addresses the set of data lines with image data for a second portion of the frame of image content. In some examples, the second portion of the frame of image content is a second line of image content from the frame of image content.

At box 674, the display device sends a fourth scan signal to the second line of pixels to move the image data from the set of data lines to the second line of pixels using the second scan line. For example, the display device can send the fourth scan signal to the subpixels of row r2 to move the image data from the data lines to the subpixels of the row r2.

At box 680, the display device activates the second line of pixels to emit light after the fourth scan signal has been sent to the second line of pixels. For example, the display device can activate the subpixels of row r2 to emit light after the fourth scan signal has been sent to the row r2.

At box 690, the display device determines whether to switch resolution mode. For example, the display device can receive a signal indicating that the display device is to switch from the higher-resolution mode of operation to the reduced-resolution mode of operation as a result of, for example: (i) a battery of a device in which the display device is housed being determined to have a power level that fell below a threshold power level, or (ii) the device receiving user input to activate a different resolution mode (e.g., activate the reduced-resolution mode). The computing device or the display device located therein may determine to switch to a reduced-resolution mode. If the display device is to not switch resolution modes, the operations of box 650) are performed again. If the display device is to switch to a different resolution mode, and that different resolution mode is the reduced-resolution mode, the operations of box 600 are performed.

The reduced-resolution mode of operation of the display device can provide a same horizontal resolution as the higher-resolution mode of operation (e.g., a same number of unique vertical lines of image data). The reduced-resolution mode of operation of the display device can provide a decrease in vertical resolution with respect to the higher-resolution mode of operation (e.g., a reduced number of unique horizontal lines of data). The decrease in vertical resolution provided by the reduced-resolution mode of operation with respect to the higher-resolution mode of operation may result from the display device not addressing the set of data lines with image data after the first scan signal is sent to the first line of pixels and before the scan signal is sent to the second line of pixels. In some examples, addressing the set of data lines with image data involves using multiplexers to route image data to the set of data lines, and the reduced-resolution mode of operation is adapted to consume fewer power resources than the higher-resolution mode of operation as a result of the multiplexers not routing image data to the set of data lines for a portion of lines of pixels in the array of pixels.

In some examples, a dynamic multiplexer control process can be used. Multiplexer operation can be dynamically controlled depending on the image contents. For example, when two or more consecutive two pixel rows are all the same color (e.g., black) in the image contents, the multiplexer circuits can be maintained in an idle state, with the multiplexer switches turned off. The multiplexer switches can be turned off from the second row of the black areas, until the next non-black contents. Thus, a row-by-row dynamic control for the multiplexer circuits can be achieved.

In some examples, the image content analysis performed to identify consecutive black rows can be performed by the DDIC 106, and the DDIC dynamically controls the multiplexer signals. In some examples, the image content analysis performed to identify consecutive black rows can be performed by the SoC 105. The SoC 105 can send a signal to the DDIC 106 indicating the rows for which the multiplexers are to remain idle. In the example described below, the DDIC 106 performs the image content analysis.

The DDIC 106 receives display input data 102 from the SoC. The DDIC can analyze the display input data 102 and determine that the display input data 102 includes more than two consecutive black lines.

The DDIC 106 can write data to the data lines for a first line of all black pixels, and then can turn off the multiplexer switches for the row lines times of the remaining black lines. Black values are written to the data lines during the row line time for the first black row. During the row line time for the second black row, a decayed version of the image data will move from the data lines to the subpixels of the second black row. Thus, the second row will appear black, though no new image data is written to the data lines for the second row.

Depending on the capacity difference between the parasitic capacitance of the data lines (CDATA) and the capacitance of the storage capacitors CST of the subpixels, the maximum number of rows that can be charged to a black data voltage without recharging the CDATA can be varied. In some examples, the CDATA may need to be recharged at intervals of every ten rows, every fifteen rows, or every twenty rows, in order to maintain a high enough VDATA on the data lines to cause the pixels to appear black.

For example, the display input data 102 can include twenty-five consecutive rows of black pixels, followed by a twenty-sixth row of at least one non-black pixel. The DDIC can be configured to refresh the CDATA at intervals of ten pixels. Thus, the DDIC can control the multiplexer 114 to write image data to the data lines during the row line time for the first black row. The DDIC can control the multiplexer 114 to remain idle during the row line times for the second black row through the eleventh black row. During the row line time for the second black row through the tenth black row, the image data on the data lines decays.

The DDIC 106 can toggle the multiplexers 114 during the row line time for the eleventh black row, causing new black image data to be written to the data lines. The DDIC 106 can control the multiplexers 114 to remain idle during the row line times for the twelfth black row through the twentieth black row. The DDIC can toggle the multiplexers 114 during the row line time for the twenty-first black row, again refreshing the black image data on the data lines.

The DDIC 106 can control the multiplexers 114 to remain idle during the twenty-second black row to the twenty-fifth black row. The twenty-sixth row includes at least one non-black pixel. Thus, the DDIC 106 can toggle the multiplexers 114 during the row line time for the twenty-sixth row, moving image data for the twenty-sixth row to the data lines.

By keeping the multiplexers 114 in an idle state during the row line times for all black rows, power consumption of the multiplexers 114 can be reduced. In some examples, instead of or in addition to idling the multiplexers 114, the DDIC 106 can idle the source amp signals, e.g., SA1 and SA2, for multiple consecutive black rows. Idling the source amp signals in addition to idling the multiplexer switches can result in increased power savings.

Embodiments of the subject matter and the functional operations described in this specification can be implemented in any suitable electronic device such as a personal computer, a mobile telephone, a smart phone, a smart watch, a smart TV, a mobile audio or video player, a game console, or a combination of one or more of these devices.

The electronic device may include various components such as a memory, a processor, a display, and input/output units. The input/output units may include, for example, a transceiver which can communicate with the one or more networks to send and receive data. The display may be any suitable display including, for example, a cathode ray tube (CRT), liquid crystal display (LCD), or light emitting diode (LED) display, for displaying images.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Embodiments may be implemented as one or more computer program products. e.g., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both.

Elements of a computer may include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer may not have such devices. Computer-readable media suitable for storing computer program instructions and data include all forms of non-volatile memory, media and memory devices, including by way of example semiconductor memory devices, e.g., EPROM, EEPROM, and flash memory devices: magnetic disks, e.g., internal hard disks or removable disks: magneto optical disks; and CD ROM and DVD-ROM disks. The processor and the memory may be supplemented by, or incorporated in, special purpose logic circuitry.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of operating a display device that includes an array of pixels addressed by a set of data lines and a set of scan lines, the method comprising:

presenting, by the display device, a first frame of image content, including by:

addressing the set of data lines with first image data for a first portion of the first frame of image content;

sending a first scan signal to a first line of pixels of the array of pixels, using a first scan line of the set of scan lines, to move the first image data from the set of data lines to the first line of pixels;

activating the first line of pixels to emit light after the first scan signal has been sent to the first line of pixels;

sending a second scan signal to a second line of pixels of the array of pixels, using a second scan line of the set of scan lines, without having addressed the set of data lines with image data after having addressed the set of data lines with the first image data, the second scan signal sent after the first scan signal wherein:

after the first scan signal is sent to the first line of pixels, the first image data that was addressed to the set of data lines decays in intensity to a decayed version of the first image data; and sending the second scan signal to the second line of pixels moves the decayed version of the first image data to the second line of pixels; and activating the second line of pixels to emit light after the second scan signal has been sent to the second line of pixels.

2. The method of claim 1, wherein the first image data comprises a set of voltages that each define an intensity at which a corresponding pixel in the first line of pixels is to emit light.

3. The method of claim 1, wherein the second line of pixels is an immediately next line of pixels in the array of pixels after the first line of pixels.

4. The method of claim 1, wherein:

the first portion of the first frame of image content is a first line of image content from the first frame of image content; and a second portion of the first frame of image content is a second line of image content from the first frame of image content.

5. The method of claim 1, wherein:

addressing the set of data lines with the first image data includes using multiple multiplexers to route the first image data to the set of data lines, each multiplexer of the multiple multiplexers being configured to route image data to a corresponding subset of data lines within the set of data lines, such that the set of data lines includes multiple subsets of data lines corresponding to the multiple multiplexers.

6. The method of claim 5, wherein the multiple multiplexers receive the first image data from a display device integrated circuit that is a component of the display device.

7. The method of claim 1, wherein presenting the first frame of image content includes:

addressing the set of data lines with third image data for a third portion of the first frame of image content;

sending a third scan signal to a third line of pixels of the array of pixels, using a third scan line of the set of scan lines, to move the third image data from the set of data lines to the third line of pixels;

activating the third line of pixels to emit light after the third scan signal has been sent to the third line of pixels;

sending a fourth scan signal to a fourth line of pixels of the array of pixels, using a fourth scan line of the set of scan lines, without having addressed the set of data lines with image data after having addressed the set of data lines with the third image data; and activating the fourth line of pixels to emit light after the fourth scan signal has been sent to the fourth line of pixels.

8. The method of claim 1, wherein the display device sends the second scan signal to the second line of pixels without having addressed the set of data lines with image data, as a result of the display device operating in a reduced-resolution mode of operation.

9. The method of claim 8, wherein the display device receives a signal indicating that the display device is to switch from a higher-resolution mode of operation to the reduced-resolution mode of operation as a result of a battery of a device in which the display device is housed being determined to have a power level that fell below a threshold power level.

10. The method of claim 9, wherein:

the reduced-resolution mode of operation of the display device provides a same horizontal resolution as the higher-resolution mode of operation; and the reduced-resolution mode of operation of the display device provides a decrease in vertical resolution with respect to the higher-resolution mode of operation.

11. The method of claim 1, wherein:

the display device presents the first frame of image content while the display device is in a reduced-resolution mode of operation;

the method comprises receiving a signal indicating that the display device is to switch from the reduced-resolution mode of operation to a higher-resolution mode of operation that is adapted to present image content with higher resolution than when the display device is in the reduced-resolution mode; and the method comprises presenting, by the display device, a second frame of image content while the display device is in the higher-resolution mode of operation, including by:

addressing the set of data lines with third image data for a first portion of the second frame of image content;

sending a third scan signal to the first line of pixels, using the first scan line of the set of scan lines, to move the third image data from the set of data lines to the first line of pixels;

activating the first line of pixels to emit light after the third scan signal has been sent to the first line of pixels;

addressing the set of data lines with fourth image data for a second portion of the second frame of image content;

sending a fourth scan signal to the second line of pixels, using the second scan line of the set of scan lines, to move the fourth image data from the set of data lines to the second line of pixels; and activating the second line of pixels to emit light after the fourth scan signal has been sent to the second line of pixels.

12. The method of claim 11, wherein:

addressing the set of data lines with image data involves using multiplexers to route image data to the set of data lines; and the reduced-resolution mode of operation is adapted to consume fewer power resources than the higher-resolution mode of operation as a result of the multiplexers not routing image data to the set of data lines for a portion of lines of pixels in the array of pixels.

13. A method of operating a display device that includes an array of pixels addressed by a set of data lines and a set of scan lines, the method comprising presenting, by the display device, a first frame of image content, including by:

addressing the set of data lines with first image data for a first portion of the first frame of image content, including using multiple multiplexers to route the first image data to the set of data lines, each multiplexer of the multiple multiplexers being configured to route image data to a corresponding subset of data lines within the set of data lines, such that the set of data lines includes multiple subsets of data lines corresponding to the multiple multiplexers;

sending a first scan signal to a first line of pixels of the array of pixels, using a first scan line of the set of scan lines, to move the first image data from the set of data lines to the first line of pixels;

activating the first line of pixels to emit light after the first scan signal has been sent to the first line of pixels;

after sending the first scan signal, sending a second scan signal to a second line of pixels of the array of pixels, using a second scan line of the set of scan lines, without the multiple multiplexers having routed image data to the set of data lines after the set of data lines was addressed with the first image data; and activating the second line of pixels to emit light after the second scan signal has been sent to the second line of pixels.

14. A method of operating a display device that includes an array of pixels addressed by a set of data lines and a set of scan lines, wherein the display device includes a display driver integrated circuit, the method comprising presenting, by the display device, a first frame of image content, including by:

addressing the set of data lines with first image data for a first portion of the first frame of image content, including sending, by the display driver integrated circuit, control signals to multiple multiplexers to route the first image data to the set of data lines, each multiplexer of the multiple multiplexers being configured to route image data to a corresponding subset of data lines within the set of data lines, such that the set of data lines includes multiple subsets of data lines corresponding to the multiple multiplexers;

sending a first scan signal to a first line of pixels of the array of pixels, using a first scan line of the set of scan lines, to move the first image data from the set of data lines to the first line of pixels;

activating the first line of pixels to emit light after the first scan signal has been sent to the first line of pixels;

after sending the first scan signal, sending a second scan signal to a second line of pixels of the array of pixels, using a second scan line of the set of scan lines, wherein the display driver integrated circuit does not send control signals to the multiple multiplexers, between the sending of the first scan signal and the sending of the second scan signal, to route image data to the set of data lines; and activating the second line of pixels to emit light after the second scan signal has been sent to the second line of pixels.

15. The method of claim 14, wherein:

the display driver integrated circuit receives second image data that is for a second portion of the first frame of image content and that is designated for the second line of pixels; and the second image data is not routed to the set of data lines by the multiple multiplexers, due at least in part to the display driver integrated circuit not sending control signals to the multiplexers, between the sending of the first scan signal and the sending of the second scan signal, to route image data to the set of data lines.

16. A method of operating a display device that includes an array of pixels addressed by a set of data lines and a set of scan lines, the method comprising:

receiving a signal indicating that the display device is to switch from a higher-resolution mode of operation to a reduced-resolution mode of operation as a result of a battery of a device in which the display device is housed being determined to have a power level that fell below a threshold power level; and presenting, by the display device, a first frame of image content, including by:

addressing the set of data lines with first image data for a first portion of the first frame of image content;

sending a first scan signal to a first line of pixels of the array of pixels, using a first scan line of the set of scan lines, to move the first image data from the set of data lines to the first line of pixels;

activating the first line of pixels to emit light after the first scan signal has been sent to the first line of pixels;

sending a second scan signal to a second line of pixels of the array of pixels, using a second scan line of the set of scan lines, without having addressed the set of data lines with image data after having addressed the set of data lines with the first image data as a result of the display device operating in the reduced-resolution mode of operation, the second scan signal sent after the first scan signal; and activating the second line of pixels to emit light after the second scan signal has been sent to the second line of pixels, wherein:

the reduced-resolution mode of operation of the display device provides a same horizontal resolution as the higher-resolution mode of operation; and the reduced-resolution mode of operation of the display device provides a decrease in vertical resolution with respect to the higher-resolution mode of operation, the decrease in vertical resolution provided by the reduced-resolution mode of operation with respect to the higher-resolution mode of operation resulting from the display device not addressing the set of data lines with image data, after the first scan signal is sent to the first line of pixels and before sending the second scan signal to the second line of pixels.

17. A display device, comprising:

an array of pixels comprising multiple pixel rows;

a set of data lines;

a set of scan lines, each scan line corresponding to one of the multiple pixel rows; and a controller configured to perform operations comprising:

operating the display device in a first resolution mode comprising addressing, using the set of data lines and the set of scan lines, all pixel rows of the multiple pixel rows with first image data for a first frame of image content; and operating the display device in a second resolution mode comprising addressing, using the set of data lines and the set of scan lines, fewer than all pixel rows of the multiple pixel rows with second image data for a second frame of image content, including sending scan signals sequentially to each of the multiple pixel rows using the set of scan lines, including:

sending a first scan signal to a first pixel row of the multiple pixel rows; and sending a second scan signal to a second pixel row of the multiple pixel rows, the second pixel row being an immediately next pixel row after the first pixel row, without writing image data to the set of data lines between sending the first scan signal and sending the second scan signal.

18. The display device of claim 17, wherein addressing all pixel rows of the multiple pixel rows with the first image data for the first frame of image content comprises:

sending scan signals sequentially to each of the multiple pixel rows using the set of scan lines; and writing a portion of the first image data to the set of data lines prior to sending each scan signal and after sending an immediately previous scan signal.

19. A display device, comprising:

an array of pixels comprising multiple pixel rows;

a set of data lines;

a set of scan lines, each scan line corresponding to one of the multiple pixel rows; and a controller configured to perform operations comprising:

addressing the set of data lines with first image data for a first portion of a first frame of image content;

sending a first scan signal to a first pixel row of the multiple pixel rows, using a first scan line of the set of scan lines, to move the first image data from the set of data lines to the first pixel row;

activating the first pixel row to emit light after the first scan signal has been sent to the first pixel row;

sending a second scan signal to a second pixel row of the multiple pixel rows, using a second scan line of the set of scan lines, without having addressed the set of data lines with image data after having addressed the set of data lines with the first image data, the second scan signal sent after the first scan signal, wherein:

after the first scan signal is sent to the first pixel row, the first image data that was addressed to the set of data lines decays in intensity to a decayed version of the first image data; and sending the second scan signal to the second pixel row moves the decayed version of the first image data to the second pixel row; and activating the second pixel row to emit light after the second scan signal has been sent to the second pixel row.

* * * * *